March 11, 1941.   W. H. WALLACE   2,234,850
LEAF SPRING AND METHOD OF MAKING SAME
Filed July 27, 1939

INVENTOR.
WILLIAM H. WALLACE
BY Kwis Hudson & Kent.
ATTORNEYS

Patented Mar. 11, 1941

2,234,850

UNITED STATES PATENT OFFICE 2,234,850

LEAF SPRING AND METHOD OF MAKING SAME

William H. Wallace, Detroit, Mich., assignor to Eaton Manufacturing Company, Cleveland, Ohio, a corporation of Ohio Application July 27, 1939, Serial No. 286,880

5 Claims. (Cl. 267—47)

This invention relates to multiple leaf springs and has particular reference to springs adapted for use in automotive vehicles although it is applicable to leaf springs for other types of vehicles and uses.

The invention has for its main object the provision of a spring made up of leaves which, in comparison with the leaves of springs as heretofore made, will have a materially greater load-carrying capacity and a longer useful life.

Through experiments and investigations made in the last several years I have determined that the life of a leaf spring may be materially increased by changing the surface characteristics of the leaves after heat treatment. Such changes in the surface characteristics may consist in cleaning and hardening the surface, on either one or both sides of the leaf, by some means such as shot-blasting. Springs made up of leaves which have been shot-blasted, in accordance with my invention, have been found to have a much longer life or durability even though the other characteristics of the spring are not materially changed.

By cleaning and hardening both the tension and compression surfaces of the leaves greater durability is obtained, but if the tension side only is cleaned and hardened by shot-blasting, or other equivalent treatment, a still greater life is obtained. By shot-blasting only the tension surface of a curved leaf in which the tension surface is on the concave side of the leaf, there is a noticeable increase in the radius of curvature or, in other words, the camber or height of the leaf is decreased and compression stresses are trapped in the outer fibers of the tension side.

In the accompanying drawing I have illustrated the application of the invention to a conventional type of leaf spring. In this drawing.

Figure 1:
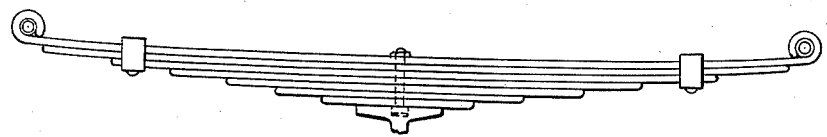
Fig. 1 is a side elevation of a leaf spring.
Figure 2:
Fig. 2 is a transverse section of a leaf of the so-called grooved section described and claimed in my prior Patent 2,026,599, granted January 7, 1936.
Figure 3:
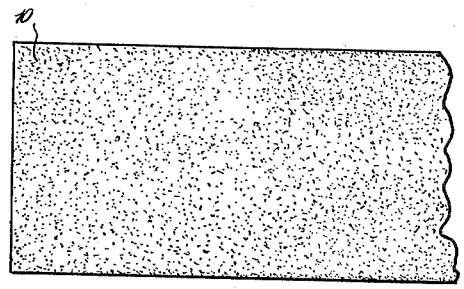
Fig. 3 is a plan view of a leaf showing the surface effect of shot-blasting.

Referring to the drawing, the spring illustrated in Fig. 1 may be made up of leaves of the ordinary substantially rectangular cross-section, or of leaves having a grooved cross-section, as illustrated in Fig. 2 and, in the latter case, the surface 10 will be the tension surface of the leaf. In the case of leaves of the common substantially rectangular cross-section the neutral axis is located substantially mid-way between the tension and compression surfaces of the leaf. But in a leaf having a grooved cross-section, as shown in Fig. 2, the neutral axis is nearer the tension surface of the leaf, and in practice the distances of the tension and compression surfaces from the neutral axis are commonly in the ratio of 5 to 6.

In the manufacture of automobile springs it is common practice to bend the leaves to the desired curvature, while hot, in a cambering machine, and then quench them. According to my invention the leaves are given an initial curvature or camber which is slightly greater than the desired final curvature. The tension surface of the leaf is then subjected to a shot-blasting operation whereby hardened steel shot, preferably about one-thirty-second of an inch in diameter, although the size of the shot may vary, are caused to impinge upon the surface. The shot are thrown from the periphery of a wheel which is running at high speed, or they may be directed by a high velocity air stream against the tension surface of the leaf and, in either case, the shot are caused to travel at such a high velocity that, when they impinge upon the surface of the leaf, they will remove any scale that is present, and also effect a cold working of the surface so that, upon the completion of the shot-blasting operation, the surface will have a very fine-grained, frosty or pebbly appearance. The shot-blasting of the tension side of the leaf has the effect of increasing the radius of curvature so that the camber in the leaf will be somewhat reduced from its initial height. The cold working of the tension side of the leaf, by the shot-blasting operation, thus sets up residual compression stresses in the fibers on the tension side.

In order to illustrate the useful effect of the application of my invention, let us assume that a leaf of the conventional rectangular cross-section is cambered and the tension side then subjected to the shot-blasting operation as above described. The residual compression stresses that may be trapped in the fibers on the tension side may be of the order of 10,000 lbs. per square inch. If the plate is then loaded so as to subject the fibers on the tension side to a stress of 100,000 lbs. per square inch, the effect of this load would be to first neutralize the trapped stress of 10,000 lbs. per square inch, and, therefore, the net effect of the load would be to subject the fibers to a tension stress of only 90,000 lbs. per square inch.

Leaves which are shot-blasted on both sides have an appreciably longer life than untreated leaves due to the surfaces being cleaned and much harder because of the shot-blasting. The hardening of the surface, of course, increases the strength of the fibers and this results in greater ability to withstand the loads and this accounts for the longer life. However, in the case of leaves which are shot-blasted on the tension side only, the life has been found to be increased to a very much greater extent because the trapped stresses in the fibers at and adjacent the tension surface have, as above explained, the effect of reducing the stress on the fibers due to any given load, so that the decrease in the stress added to the greater strength due to the cold working of the fibers results in a very much longer life. In this connection it should be noted that the fibers at the tension and compression surfaces of the leaf are subjected to the maximum stresses by any given load and practically all failures are due to rupturing of the surface fibers on the tension side so that, since the effect of the shot-blasting is to not only strengthen these outermost tension fibers but, because of the trapping of compression stresses in them, the actual tension stress to which the fibers are subjected by any given load is very much reduced and this accounts for the longer life which I can conservatively state as being not less than 60% greater than that of a leaf that has not been subjected to the shot-blasting treatment in accordance with my invention.

While I have illustrated and described what I now consider to be the preferred method of practicing my invention, it will be understood that changes may be made in this method and that it may also be applied to leaves of other cross-sections than those illustrated without departing from the spirit of my invention as defined in the appended claims.

Having thus described my invention, I claim:

1. A leaf spring comprising a plurality of superposed leaves the surfaces of which have been shot-blasted on the tension surface only to harden the fibers at and adjacent to the tension surface and create therein inherent residual compression stresses which increase the load-carrying capacity of the spring.

2. A leaf spring comprising a plurality of superposed leaves each having a cross-section the neutral axis of which is substantially nearer to the tension surface of the leaf than to the compression surface, the tension surfaces only of said leaves having been shot-blasted to harden the fibers at and adjacent to the tension surface and create therein inherent residual compression stresses which increase the load-carrying capacity and durability of the leaves.

3. A spring leaf which after being cambered and heat-treated has been shot-blasted on its tension surface only to increase the hardness and the tensile strength of the fibers at and adjacent to the tension surface of the leaf relative to the fibers at and adjacent to the compression surface of the leaf.

4. A spring leaf which, after being cambered and heat-treated, has been shot-blasted on its tension surface only to a degree sufficient to substantially increase its radius of curvature and create in the fibers at and adjacent to the tension surface inherent residual compression stresses.

5. A spring leaf having a cross section the neutral axis of which is substantially nearer to the tension surface of the leaf than to the compression surface, and which, after being cambered and heat-treated has been shot-blasted on its tension surface only, to a degree sufficient to substantially increase its radius of curvature and create in the fibers at and adjacent to the tension surface inherent residual compression stresses.

WILLIAM H. WALLACE.